United States Patent [19]

McWhorter

[11] 3,908,623
[45] Sept. 30, 1975

[54] ADVANCED RECIPROCATING ENGINE SYSTEM

[76] Inventor: Edward M. McWhorter, 6931 Greenbrook Cir., Citrus Heights, Calif. 95610

[22] Filed: Aug. 23, 1974

[21] Appl. No.: 499,909

[52] U.S. Cl. ............ 123/197 A; 74/579 E; 74/581; 92/187; 123/197 AB; 123/197 AC
[51] Int. Cl.² ......................................... F02B 75/32
[58] Field of Search... 123/197 A, 197 AB, 197 AC; 74/44, 581, 579 E; 92/187, 208

[56] References Cited
UNITED STATES PATENTS

| | | | |
|---|---|---|---|
| 1,379,115 | 5/1921 | Mallory | 123/197 A |
| 1,430,491 | 9/1922 | Calcaterra | 123/197 A |
| 2,160,012 | 5/1939 | Botsford | 74/581 |
| 2,368,412 | 1/1945 | Cords | 123/197 AB |
| 2,458,111 | 1/1949 | Soltesz | 74/579 E |
| 3,034,362 | 5/1962 | Caddell | 123/197 AB |
| 3,693,463 | 9/1972 | Garman | 123/197 AB |
| 3,859,976 | 1/1975 | McWhorter | 123/197 A |

*Primary Examiner*—Charles J. Myhre
*Assistant Examiner*—Daniel J. O'Connor

[57] ABSTRACT

This invention relates to new and useful improvements in the mechanism comprising the piston and piston connecting rod of the reciprocating internal or external combustion engine systems. Pressure forces acting on the piston face are concentrated in an intermediate linkage and subsequently transmitted to the connecting rod which reacts as a three-force member in the form of a second-class lever system. The purpose of the invention is to increase the mechanical efficiency of such systems during the period when the crank position is near top-dead-center. This is accomplished by introducing piston forces tangentially to the longitudinal axis of the connecting rod in a manner which increases the net rotative effort applied to the crankshaft.

3 Claims, 4 Drawing Figures

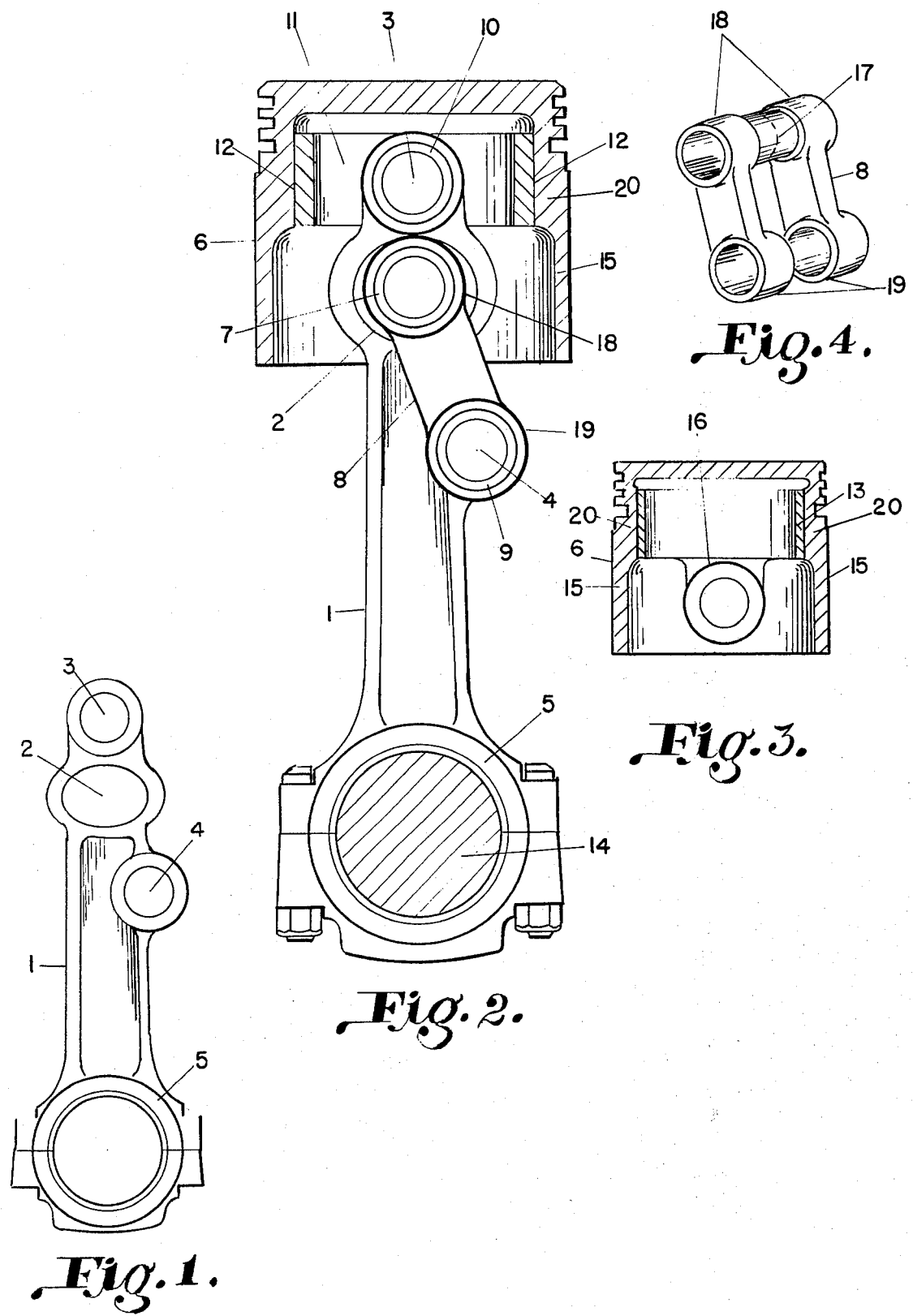

ADVANCED RECIPROCATING ENGINE SYSTEM

CROSS REFERENCE

This application is similar to my copending application Ser. No. 378-432 Internal Combustion Engine Combustion Control Piston filed on 12 July, 1973, now U.S. Pat. No. 3,859,976.

BACKGROUND OF THE INVENTION

1. Field of the Invention

In the ordinary reciprocating piston driven engine, piston motion is controlled entirely by the rotation of the crankpin. The reciprocating mechanism presented in this disclosure belong to a class of engine systems in which an additional degree of freedom of piston motion is provided by the introduction of an intermediate linkage placed between the piston and the piston connecting rod. These systems have become known by those working in the field as "advanced reciprocating systems". The advanced reciprocating engine system consists of two basic types, those having connecting rod systems which operate as first class lever systems and those which have connecting rod systems which operate as second-class lever systems. The mechanism presented in this disclosure is basically of the latter type.

2. Description of Prior Art

If we disregard inertial forces the ordinary connecting rod of the modern reciprocating piston driven engine can be considered as a simple two-force member in which only colinear resultant compressive or tensile stresses, introduced at each end of the rod, are of primary structural consideration. In the advanced reciprocating engine system the piston load force is introduced tangentially to the longitudinal axis of the connecting rod. This type of loading produces a bending mode normal to the connecting rod longitudinal axis. The connecting rod, therefore, becomes a three-force member which is another distinguishing feature of this type of engine system.

It has been discovered that by placing the point at which the connecting rod pivots within the piston, above the point at which the intermediate linkage is attached to the piston, the pressure forces acting on the piston are applied tangentially to the axis of the connecting rod in a manner which will increase the net rotative effort applied to the crankshaft when the piston is at the top-dead-center position. This affect cannot be achieved in the first-class lever connecting rod systems, and only by compromising performance can it be achieved within the configuration of preceding second-class lever connecting rod systems.

SUMMARY OF THE INVENTION

The primary object of this invention is to provide in a manner hereinafter set forth, an engine of the aforementioned character comprising a plurality of pistons and piston connecting rods in which the pressure forces acting on the piston at top-dead-center position are tangentially applied to the connecting rod in a manner which will produce a higher net rotative force.

Another very important object of the invention is to provide an engine of the aforementioned character in which the reciprocating motion of the piston is not limited to the motion imposed by rotation of the engine crankshaft crankpin.

Other objects of the invention are to provide an engine of the character described which will operate within the conditions of the several combustion cycles employed in the reciprocating types of internal and external combustion engines.

All of the foregoing and still further objects and advantages of the invention will become apparent from a study of the drawings and specification presented.

BRIEF DESCRIPTION OF THE DRAWINGS

There is presented, as part of the specification, drawings which show the assembly and various components comprising the assembly of the invention.

FIG. 1 illustrates the various elements comprising the connecting rod.

FIG. 2 is a view of the reciprocating assembly showing the piston principally in longetudinal cross-section.

FIG. 3 illustrates an alternate method of piston construction showing the piston principally in cross-section.

FIG. 4 is a perspective view of the connecting link.

DESCRIPTION OF THE PREFERRED EMBODIMENTS

FIG. 1 shows the details of connecting rod 1. Connecting rod 1 is widened at the upper end to provide an opening 2 through the central or longitudinal axis. A small journal 3 is located above opening 2 at the upper end of connecting rod 1 and a second small journal 4 is located at one side of the longitudinal axis below opening 2. As will be shown later in the specification which follows, an alternate method of fabricating connecting rod 1 may replace journal 4 with cylindrical protrusions on both sides of the rod to form a pin at the same location, said cylindrical protrusions having the same axial center as the journal 4. A large journal 5 is located at the lower end of connecting rod 1 which is suitable for rotatively mounting on a crankpin.

FIG. 2 shows the method of attaching piston 6 to connecting rod 1 and illustrates the method of operation. Piston pin 7 is a hollow or tubular pin which passes through opening 2 of connecting rod 1. Piston pin 7 extends transversely across piston 6 and is pivotally journaled in piston 6 at each end. Connecting link 8 is pivotally mounted on piston pin 7 and extends downward on both sides of connecting rod 1. It should be noted that opening 2 is sufficiently large enough such that piston pin 7 or connecting link 8 will at no time contact connecting rod 1 during normal operation. The lower end of connecting link 8 is pivotally mounted on rod pin 9 which is in turn pivotally journaled or fixedly attached in small journal 4 of connecting rod 1. Rod pin 9 is shown as a tubular or hollow cylinder. It can, however, be seen by those skilled in the art that rod pin 9 could be fabricated as an integral part of connecting rod 1 during the casting or forging process. In this instance the rod pin 9 would be a solid cylindrical protrusion on both sides of connecting rod 1 and would have the same axial center and be located at the same point where journal 4 is presently shown. These cylindrical protrusions could then be drilled hollow in the subsequent machining operation in order to lighten the connecting rod 1 weight. In this case bearing surfaces in contact with connecting link 8 would be provided by bronze bushings which would be press fit upon each end of the formed pin 9. At the upper end of connecting rod 1, a hollow slide pin 10 is pivotably mounted in small journal 3 of connecting rod 1. Slide pin 10 extends transversally across piston slide 11 and is pivotably journalled in piston slide 11 at each end. Piston slide 11 is slidably in contact with the inner machined surfaces 12 of piston crown 20. It is not difficult for those skilled in the art to recognize the fact that the machining operation necessary to provide machined surfaces 12 on the upper interior portion of piston crown 20 is quite difficult and is not easily adaptable to high speed production methods. Therefore, an alternate method of providing machined surfaces 12 is presented in FIG. 3. A precision machined slide surface insert 13 would be fabricated outside of the piston and then fixedly attached to the interior surfaces of piston crown 20 as shown, by either press-fit, shrink-fit, composite bonding, or by mechanical methods such as slip rings, or screw thread, or by any other general method familar to those skilled in the art. Slide surface insert 13 may be of any convenient configuration which will allow its insertion past piston bosses 16 which hold piston pin 7 and which are located opposite each other on piston skirt 15. It should also be noted that sliding surfaces provided by slide surface insert 13 are not required around the full 360° perimiter of the piston crown 20. Sliding surfaces would therefore only be provided in those areas of the perimeter in which the major and minor side thrust vector forces are directed as a result of the changing angularity of connecting rod 1.

As shown in FIG. 4 the connecting link 8 may be fabricated as a single piece or as a two piece component in which each piece would be a mirror image of its counter part by the separation of the link 8 at point 17 along the dotted line. If rod pin 9 is formed as an integral part of connecting rod 1, as previously discussed, it would then be necessary that link 8 be fabricated as a two-piece component in order to facilitate the mounting of journals 19 of link 8 upon the rod pin 9. The journals 18 at the upper end of link 8 would then be held together by the pivotably mounted piston pin 7.

The mechanical system described operates as follows. Distributed pressure forces acting on the face of piston 6 are transferred to connecting rod 1 through the intermediate link 8 which is pivotably journaled on piston pin 7 at journals 18 at one end and to the rod pin 9 at journals 19 at the other end. The top of the connecting rod holds slide pin 10 which is slidably in contact with the interior surfaces of piston crown 20. The piston slide 11 operates as a crosshead moving up and down parallel to the piston axis. Reactive forces generated by the rotation of crankpin 14 are transmitted to the piston through the connecting rod 1 and link 8 as a lever of the second class. The system presents an additional degree of freedom between the centerline distances of crankpin 14 and piston pin 7. The useful improvements of such a system when compared to similar types of systems is as follows.

Piston forces transmitted through link 8 to connecting rod 1 generate a moment of gyration around the axial center of slide pin 10 which is in the same direction as that induced by the rotation of the crankpin. Therefore, the forces generating the moment are additive. This condition increases the net rotative effort applied to the crank and in particular facilitates movement of the piston past the top-dead-center position when the crank is at the top neutral position. Operation in this manner is made possible by the fact that the connecting rod 1 pivot point located along the axis of slide pin 10 is located above the piston bosses 16. Therefore, the vector force operating along the axis of link 8 between piston pin 7 and rod pin 9 produce a rotation of crankpin 14 in a positive direction when the piston 6 is at the top-dead-center position.

It should also be noted that the reciprocating system presented is also applicable in the construction of positive displacement pumps and air compressors which operate on the reciprocating principle.

In engines of the character described I claim:

1. A piston, a piston slide in slidable contact with the interior surfaces machined in the crown of said piston, a slide pin extending transversly across said piston slide each end of which is pivotally mounted in said piston slide, a connecting rod having a small journal at one end which holds said slide pin, below said small journal an opening in said connecting rod, below said opening and position to one side of the longitudinal axis of said connecting rod a second small journal on said connecting rod said second small journal holding a rod pin, a connecting link being pivotally journaled to each end of said rod pin, at the opposite end of said link a piston pin also pivotally journaled in said connecting link, said piston pin and connecting link journal pass through the said opening of said connecting rod and extend transversly across said piston, said piston pin being pivotally journaled at each end in said piston, at the opposite end of said connecting rod a large journal for rotatively mounting on an engine crankpin.

2. A piston, a piston slide in slidable contact with the machined surfaces of an insert fixedly attached to the interior surfaces of the crown of said piston, a slide pin extending transversly across said piston slide each end of which is pivotally mounted in said piston slide, a connecting rod having a small journal at one end which holds said slide pin, below said small journal an opening in said connecting rod, below said opening and position to one side of the longitudinal axis of said connecting rod a second small journal on said connecting rod said second small journal holding a rod pin, a connecting link being pivotally journaled to each end of said rod pin, at the opposite end of said link a piston pin also pivotally journaled in said connecting link, said piston pin and connecting link journal pass through the said opening of said connecting rod and extend transversly across said piston, said piston pin being pivotally journaled at each end in said piston, at the opposite end of said connecting rod a large journal for rotatively mounting on an engine crankpin.

3. A piston, a piston slide in slidable contact with machined surfaces in the crown of said piston a slide pin extending transversly across said piston slide each end of which is pivotally mounted in said piston slide, a connecting rod having a small journal at one end which holds said slide pin, below said small journal an opening in said connecting rod below said opening and positioned to one side of the longitudinal axis of said connecting rod cylindrical protrusions on both sides of said connecting rod forming a rod pin, the axis of said rod pin running parallel with the axis of the slide pin, a connecting link being pivotally attached to each end of said rod pin, at the opposite end of said link a piston pin also pivatally journalled in said connecting link, said piston pin and connecting link journal pass through the said opening of said connecting rod and extend transversly across said piston, said piston pin being pivotally journaled at each end in said piston, at the opposite end of said connecting rod a large journal for rotatively mounting on an engine crankpin.

* * * * *